United States Patent
Li

(10) Patent No.: US 6,698,703 B2
(45) Date of Patent: *Mar. 2, 2004

(54) COMPARTMENT MOUNTED AUTOMOTIVE BEVERAGE CONTAINER HOLDER

(76) Inventor: Bernard A. Li, P.O. Box 8705, Rancho Santa Fe, CA (US) 92067

( * ) Notice: Subject to any disclaimer, the term of this patent is extended or adjusted under 35 U.S.C. 154(b) by 0 days.

This patent is subject to a terminal disclaimer.

(21) Appl. No.: 09/974,570

(22) Filed: Oct. 9, 2001

(65) Prior Publication Data

US 2002/0047078 A1 Apr. 25, 2002

Related U.S. Application Data

(62) Division of application No. 09/469,938, filed on Dec. 21, 1999, now Pat. No. 6,361,009.

(51) Int. Cl.⁷ .................................. A47K 1/08
(52) U.S. Cl. .................... 248/311.2; 248/314
(58) Field of Search .................... 248/311.2, 310, 248/314, 315, 309.1, 912; 224/926

(56) References Cited

U.S. PATENT DOCUMENTS

| | | |
|---|---|---|
| D228,304 S | 9/1973 | Lerew et al. |
| 4,183,226 A * | 1/1980 | Moore ................ 62/457 |
| D265,351 S | 7/1982 | Wooters |
| D279,235 S | 6/1985 | Langland |
| D287,789 S | 1/1987 | Johnson |
| 4,721,216 A | 1/1988 | Kinder |
| D295,709 S | 5/1988 | Evans et al. |
| 4,844,400 A | 7/1989 | Jasmagy, Jr. |
| 4,974,741 A * | 12/1990 | Gustafson et al. ........ 220/85 H |
| D331,175 S | 11/1992 | Jones et al. |
| 5,174,534 A * | 12/1992 | Mitchell ................ 248/311.2 |
| 5,224,679 A * | 7/1993 | Code .......................... 248/314 |
| 5,282,598 A | 2/1994 | Greene ................... 248/311.2 |
| 5,356,107 A * | 10/1994 | Sinohuiz ................. 248/311.2 |
| D358,967 S | 6/1995 | Knighton |
| 5,624,404 A * | 4/1997 | Fisler ....................... 604/187 |
| D380,650 S * | 7/1997 | Norris ........................ D7/619 |
| 5,676,340 A * | 10/1997 | Ruhnau .................. 248/311.2 |
| 5,709,105 A * | 1/1998 | Palermo .................... 62/457.4 |
| 5,720,458 A | 2/1998 | Carpenter ............... 248/205.1 |
| D391,452 S | 3/1998 | Huebert |
| 5,730,522 A | 3/1998 | Wyke et al. ............... 362/432 |
| D398,127 S | 9/1998 | Bergin et al. |
| 6,045,173 A * | 4/2000 | Tiesler et al. .............. 296/37.8 |
| 6,253,982 B1 * | 7/2001 | Gerardi ..................... 224/544 |

* cited by examiner

Primary Examiner—Gwendolyn Baxter
(74) Attorney, Agent, or Firm—Fulwider Patton Lee & Utecht, LLP

(57) ABSTRACT

A beverage container holder formed with an upright body configured with an open top cavity and includes a downwardly projecting stem configured to complementally fit the cross section of a car door pocket or center console opening.

21 Claims, 1 Drawing Sheet

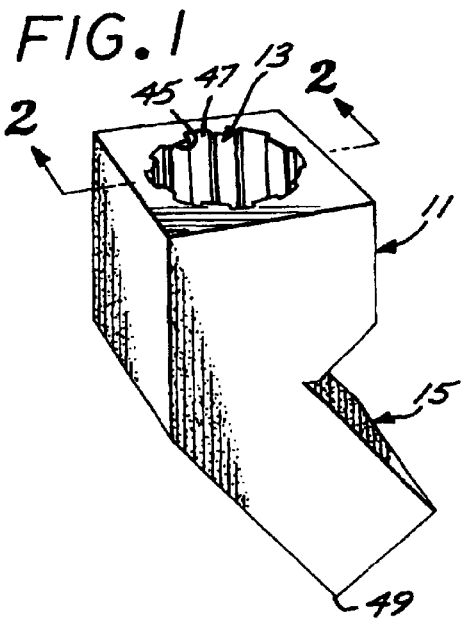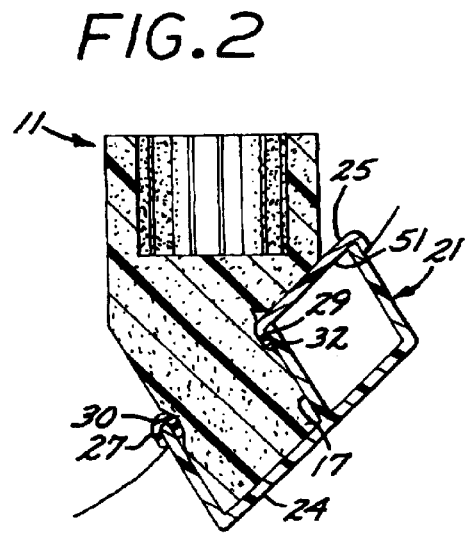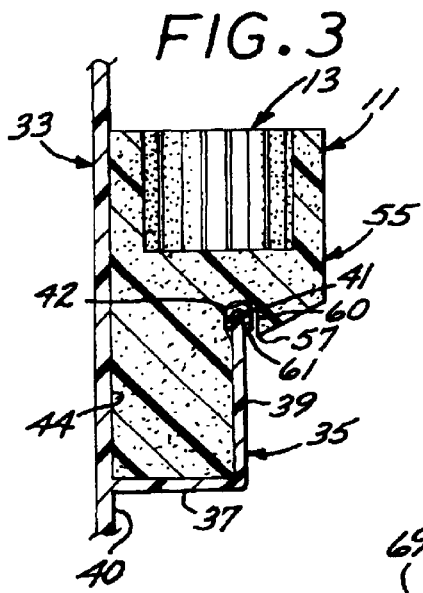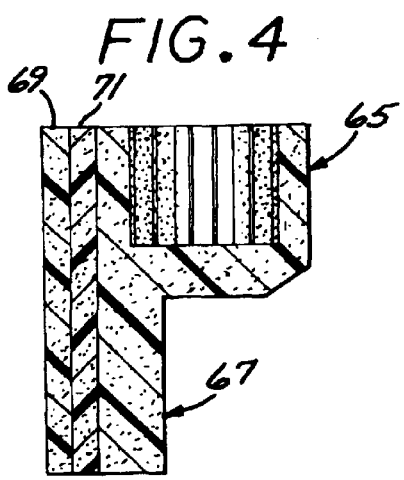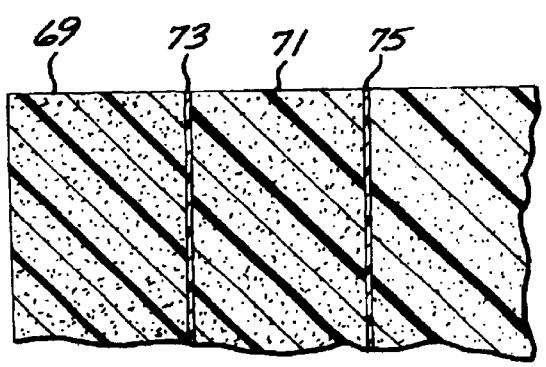

COMPARTMENT MOUNTED AUTOMOTIVE BEVERAGE CONTAINER HOLDER

CROSS-REFERENCE TO RELATED APPLICATION

This application is a divisional of application Ser. No. 09/469,938 filed Dec. 21, 1999, now U.S. Pat. No. 6,361,001, the disclosure of which is incorporated fully herein by reference.

FIELD OF THE INVENTION

The present invention relates to portable devices mountable in an interior automotive compartment for holding beverage containers.

DESCRIPTION OF THE PRIOR ART

Those who commute by automobile often prefer the benefit of carrying a beverage, such as hot coffee, a soda or lemonade, with them during their travels to both maintain their hydration and interrupt the monotony of travel. In recognition of this desire, many efforts have been made throughout the years to provide a satisfactory beverage container for use by the commuter. Examples include trays to straddle the center console of an automobile and configured with upwardly opening openings for receipt of a cup, glass or bottle. Other efforts have led to the provision of covered cups or containers configured with openable discharge ports through which the hydrating liquid can be drawn. Many commuters, however, prefer a holder which will conveniently receive a cup or bottle into which the liquid is originally dispensed or stored. Some holders have been proposed which are in the form of a thermally insulative holder which telescopes over the exterior of a cup or bottle to be grasped by the user and to insulate the beverage so as to maintain its temperature. These devices, however, are not typically stable for holding the beverage in a stable position. Thus the driver or passenger is forced to incur the risk of securing the holder in his or her lap. Such a risk can pose great danger to the driver, particularly when hot liquids are contained in the beverage container. This risk is acute when a standard shift automobile is being driven, requiring repeated manipulation of the foot and knees of the operator. In recognition of these shortcomings, holders have been proposed configured with a particular wedge shape so as to be complementally received between the legs of a driver and configured on its bottom with an upwardly and forwardly sloping surface to complement the typical upward and forward slope of an automotive seat. A device of this type is shown in U.S. Pat. No. 4,721,216 to Kinder. Such devices, while providing some stability for the holder, are not totally satisfactory since the driver must concentrate on holder his or her legs still and in a particular position to safely hold a cup against tilting which may cause spillage of the contained hot coffee or the like.

Other drink container holders have been proposed which include a ring suspended from a pliable hanger which may be bent to different positions for hanging over differently shaped objects, such as the side window glass of an automobile. A device of this type is shown in U.S. Pat. No. 4,844,400 to Jasmagy, Jr. These devices have not enjoyed particular commercial success since their successful use is dependent on locating an object in an automobile which is properly shaped for receipt of the hanger and which is located for convenient access of the beverage by the driver or passenger.

Other efforts to provide a stabilized beverage container holder have led to the proposal of a cylindrical tube configured with a tongue projecting laterally from the bottom wall thereof to be releasably received in the crack formed between the bottom and back of an automobile seat. A device of this type is shown in U.S. Pat. No. 5,282,598 to Greene. Such devices, while providing some stability, suffer the shortcoming that they are of limited utility at different locations in the passenger cabin and are not practical for use in the front seat when both the driver and passenger seats are occupied.

Prior efforts have led to the development of holders having stems for receipt in automotive cup holder sockets of a conventional size and themselves configured with a cavity for receiving an oversized holder. Examples of such devices are shown in U.S. Pat. No. Des. 380,650 to Norris, No. 5,676,340 to Rubnau and U.S. Pat. No. 4,974,741 to Gustafson. While acceptable for mounting in a conventional cylindrical beverage receptacle, such devices will not serve the purpose of mounting in polygonal compartments such as a counsel compartment or door pocket to be wedged in place and held in position in such compartments not typically intended to mount beverage containers.

Thus, there exists a need for a portable beverage container which may be securely mounted in a console compartment or door pocket of the automobile for positively holder a beverage container in an upright position for easy access by the driver or passenger.

SUMMARY OF THE INVENTION

The present invention is characterized by a beverage container holder having an upright block or body formed with an upwardly opening container-receiving bore and formed with a downwardly projecting stem polygonal in horizontal cross-section and having a dimension to substantially fill a corresponding dimension in a polygonal door pocket or console in the interior of a car.

BRIEF DESCRIPTION OF THE DRAWINGS

FIG. 1 is a perspective view of a portable beverage container holder embodying the present invention;

FIG. 2 is a vertical sectional view, in reduced scale, taken along the lines 2—2 of FIG. 1;

FIG. 3 is a sectional view, perpendicular to that of FIG. 2, and showing the holder mounted in the side pocket of an automobile;

FIG. 4 is a vertical sectional view of a second embodiment of the portable beverage container holder of the present invention; and FIG. 5 is a partial sectional view, in enlarged scale, similar to FIG. 4.

DESCRIPTION OF THE PREFERRED EMBODIMENTS

Referring to FIG. 1, a portable beverage container holder of the present invention includes, generally, a upstanding block shaped body 11 formed with an upwardly opening beverage receiving bore 13 and a downwardly projecting elongated rectangular mounting stem 15. As shown in FIG. 2, the stem 15 is formed with a longitudinal width substantially complementing the longitudinal dimension in a console cavity 17 normally utilized to receive a pivotable ashtray, tape decks or compact disks.

It is important that the holder be mounted with some degree of stability and security. It is preferable that the holder be constructed of thermally insulative material so as to insulate the container against exchange of heat from the interior of the automobile.

The holder of the present invention is preferably constructed of a thermo plastic open cell foam. A foamed polyurethane can be utilized of either open or closed cell construction or other insulative materials. Preferably, a thermo plastic foam is employed, which is, to at least some degree compressible in, at least the stem area to be compressed laterally for insertion in a selected compartment and to then inherently flex laterally outwardly against the walls of such compartment to be frictionally held in place. This affords the advantage of a unitary piece providing inexpensive manufacture and structural integrity. The foam, while typically impermeable, may have porosity for insulating purposes.

Different automobiles are formed with different interiors. Some automobiles are formed with a center console configured on the top side with various compartments for receipt of ashtrays, tape decks, compact disks, maps or the like. Such compartments are typically incorporated in a cluster or module, generally designated 21, which would be configured with the upwardly opening rectangular cavity 17 recessed below an upwardly and forwardly inclined adjacent top wall 25. The console may angle upwardly and forwardly at about 30° to the horizontal with the top wall 25 set at a similar angle. The compartment 17 may angle rearwardly and upwardly at a slight acute angle relative to the bottom wall of the module 21 and is open on its top end. Oftentimes, the compartment 17 is formed around its periphery with a peripheral bead 27 or lip 29.

Many automobiles include side doors, generally designated 33, having side pockets, generally designated 35, hung cantileverally from the interior wall 40 and having a bottom wall 37 and interior vertical pocket wall 39 having an upper edge which may also be covered by a bead 41. Such walls cooperate to form a side pocket cavity 44.

The console compartments 17 are typically on the order of 6 to 8 cm in length in the fore and aft directions and about 10 cm wide and about 7 cm deep. The side pockets 35 are typically on the order of about 6 cm wide and 10 to 12 cm deep. It is preferable that the stem 15 be friction fit in at least one transverse dimension in the particular cavity 17 or 44 and there is also some advantage to the bottom end of such stem abutting the bottom wall of the cavity to stabilize the holder and facilitate in supporting the weight of the beverage container and fluid contained therein. Such stem may be formed with a transverse cross section about 10% greater than that of the respective cross section of the compartment into which it will be fitted so that, upon insert, such stem is compressed so the inherent outward flex thereof will tend to hold it frictionally in position. This compressibility may vary from slight to a very substantial amount, it only being important that the walls of the lateral stem closely fit the compartment in at least one lateral dimension to form a frictional fit to thus enhance stability and minimize shifting of such stem during acceleration, deceleration and turning of the automobile.

The body 11 of the holder in the preferred embodiment is square in horizontal cross section and generally rectangular in vertical cross section with the cavity 13 having a major diameter of about 6 centimeters. Preferably, the cavity 13 is configured with vertical ribs 45 separated by vertical grooves to be spaced thereabout to facilitate compression under the force of the side walls of the container to thus facilitate mounting therein of beverage containers of various different diameters and side walls angles defining different frusto conical shapes. In some embodiments, the cavity 13 is itself frusto conical in shape to be formed with downwardly and inwardly sloped side walls.

Referring to FIG. 2, in one plane, the stem 15 angles downwardly and forwardly at an acute angle to the central axis of the container cavity 13 to complement the upwardly projecting angle of the console compartment 17 so that, when inserted therein, the body 11 will be held in its upright position. The stem is 6.5 cm wide in that longitudinal dimension to be compressed down to about 6 cm upon insertion to establish a close fit relationship between the front and back walls of such compartment 17. As will be noted, the back and front walls of such stem are compressible so that, upon insertion, they will be compressed on the back side by the bead 27 to form a horizontal groove 30 and on the front side by the lip 29 to form a horizontal groove 32 to thus enhance the gripping force applied to such stem. The bottom surface of such stem is cut in the fore/aft plane to angle upwardly and forwardly at about 30° to the horizontal to thus complement the bottom wall 24 of such compartment 17 so as to add stability to the mounting thereof.

In the plane transverse to the automobile in which the holder is mounted, the stem projects vertically downwardly, as shown in FIG. 3, and is configured with a lateral dimension of 7 cm to establish a close fit relationship in the pocket compartment 40 upon installation. Preferably, the bottom corner 49 of such stem projects transversely along a horizontal transverse line and the stem itself is about 10 cm long to thus cause such bottom corner 49 to abut the bottom wall 37 of the compartment 44 to thus afford additional vertical support for the holder.

In the preferred embodiment, additional stability is afforded the holder, both when mounted in the console module 21 and when mounted in the side pocket 35. To this end, the body 11 (FIG. 2) is formed at its lower forward corner with a stabilizer formed by an upwardly and forwardly projecting chamfer surface 51 which angles upwardly and forwardly at about 45° to the vertical axis of the beverage container cavity 13. This angle serves to complementally contact the top side of the wall 25 on the forward side of the cavity 17 for abutting engagement therewith to enhance the stability of the holder as mounted.

With respect to the side pocket 35, it will be appreciated that the body 11 projects laterally inwardly from the innermost wall of the stem to mount such body positioned almost centrally over the interior pocket wall 39. Such body is formed on its bottom side with a longitudinally projecting hanger, generally designated 55, formed by a downwardly projecting foam plate defining a hook 57 which cooperates in forming a longitudinally projecting, downwardly opening groove 61 that essentially hooks over the bead 41 formed on the top marginal edge of the interior wall 39 of the compartment 35. The compressibility of the foam constructing the stem and hook will facilitate flexing to accommodate different dimension compartments and thickness of interior compartment wall 39. This thus provides additional support directly under the container cavity 13 and the forward/aft horizontally extending top wall of such grooves affords stability against fore and aft rocking of the holder while the overhanging hook 57 serves to provide lateral support.

In operation, it will be appreciated that the holder 11 may be packaged in the normal peg hanger or vacuum packed packaging and can be purchased in the typical automotive outlet store, gas station or coffee shop. The user can store a selected number of such holders in the automobile trunk or other convenient location for use as desired. In the morning commute when, for instance, a coffee purchase is made, the holder may be withdrawn from its stored location and the driver or passenger will select the location where it is to be mounted. In the case of center console mounting, the holder may be oriented with the stem projecting downwardly and forwardly, as shown in FIG. 2, and, while grasping the body 11, the stem may be driven down into the compartment 17. It will be appreciated that any removable structure otherwise located in such compartment 17, such as an ashtray or the like, will have been removed ahead of time. With the stem 15 firmly inserted in the compartment 17, the forward and rearward walls thereof will be in firm contact with the forward and rearward walls of such compartment. Moreover, the bead 27 and lip 29 will serve to compress such forward and rearward walls inwardly and forming respective compressed grooves 30 and 32 on the respective rearward and forward walls thereof to facilitate gripping of such stem for preventing unwanted dislodgement thereof from the cavity 17.

In those compartments 17 having a depth equal to or less than the length of the stem, the bottom surface of such stem will be in contact with the bottom wall 24 of the compartment to provide additional support. Additionally, in those compartments where the top wall 25 of the module is so oriented as to be in contact with the stabilizer chamber surface 51, additional support will be afforded thereby, particularly when the automobile is decelerating. Thus, the container cavity 13 will be held in a vertical orientation for convenient and reliable holding of the container. For oversized containers, as the container is inserted in the compartment, the respective vertical ribs 45 will be compressed outwardly to allow the container to be received in such cavity. Then, when the automobile is underway, the holder will hold the container firmly in its upright position, both during acceleration and deceleration and during right and left hand turns. The beverage in such container will be insulated around the walls thereof against the temperature differential within the cabin of the vehicle. The stagnant air trapped in the respective grooves 47 of the cavity 13 will enhance the insulative characteristics of the subject holder.

In other instances, where the driver or passenger prefers to mount the container from a side pocket 35, the holder may be oriented with the overhang defining the hook 57 disposed toward the interior of the passenger compartment. The holder may be positioned against the interior side wall of the door 33 and the stem 15 compressed laterally and driven downwardly into the pocket compartment 44 with the straight, flat laterally outwardly facing vertical wall thereof firmly supported against the door interior wall 40. In those instances where the width of the pocket compartment 40 is less than the width of the stem, the bead 41 along the top edge of the pocket wall 39 will serve to compress the interior side of such stem inwardly to form the retainer groove 42 thus providing enhanced frictional gripping of the stem. Moreover, the bead 41 will be received in the groove 60 behind the hook 57 and will be configured such that the top edge of such bead 41 will abut the top wall of such groove along the longitudinal surface thereof to afford additional support against forward and rearward rocking of the holder within such compartment. It is noted that the container-receiving bore 13 is located nearly centered above the pocket wall 39 so that the weight of the beverage will essentially be supported vertically above such wall to thus enhance stability. Finally, in those compartments 44 having a depth complementing that of the length of the stem 15 or greater, the bottom corner 49 of the stem will abut the bottom wall 37 and provide additional vertical support for the container within the cavity 13.

Referring to FIGS. 4 and 5, the embodiment shown therein includes, generally, a body 65 and a stem device 67 including a plurality of removable compressible spacers 69 and 71. The spacers 69 and 71 include interposed therebetween self-adhesive layers 73 and 75 for selective removal thereof such as to afford different widths of the stem device for accommodating different lateral dimensions in the respective compartments 17 and 44. It will be appreciated that such spacer devices may be included on two orthogonal sides of the holder to provide for variable spacing in both the lateral and fore/aft dimensions. It will be appreciated by those skilled in the art that the holder shown in FIG. 4 operates substantially the same as that shown in FIGS. 1 through 3 except that the spacers 69 and 71 are added or removed, as the case may be, to complement the lateral dimension of the particular cavity 17 or 40 into which the holder is to be mounted.

From the foregoing, it will be appreciated that the beverage container holder of the present invention is relatively sturdy in construction, convenient to use and provides a highly stable platform for mounting of a beverage container.

What is claimed is:

1. A beverage container holder adapted to mount in a horizontal cross section, upwardly opening storage compartment in an interior, such compartment having opposite planar compartment walls spaced apart a predetermined distance and comprising:
    a thermoplastic foam body for disposition over such compartment and formed with an upwardly opening cavity configured to receive a beverage container;
    a downwardly projecting polygonal in horizontal cross section thermoplastic foam stem device integral with said body and having oppositely facing planar walls spaced apart to contact said compartment walls and adapted to be received complementally in friction fit relationship in said compartment to be held therein to hold a beverage container received in said cavity.

2. A holder as set forth in claim 1 wherein:
    said block and stem are constructed of thermoplastic foam.

3. A holder as set forth in claim 1 wherein:
    said block and stem are formed on their respective one side with a flat linear wall surface.

4. A holder as set forth in claim 1 wherein:
    said stem is formed of compressible foam having at least one relaxed lateral dimension greater than the corresponding lateral dimension of said interior compartment.

5. The beverage container set forth in claim 1 wherein:
    said stem is configured with a horizontal cross section having a width of 6.5 cm.

6. The beverage container as set forth in claim 1 wherein:
    said stem is configured with a horizontal cross-section having a width of 10 cm.

7. The beverage container set forth in claim 1 wherein:
    said stem is configured with a bottom wall to angle downwardly and forwardly at an angle of 30 degrees to the horizontal.

8. The beverage container set forth in claim 1 wherein:
    said stem is formed with a horizontal cross-section having one dimension of at least 7 cm.

9. The beverage container holder of claim 1 for receipt in the door pocket of an automobile having an interior wall wherein;
    said body is formed with an over hang projecting laterally inwardly over the top edge of said wall and having a downwardly facing surface for abutting said top edge to stabilize said holder.

10. The holder as set forth in claim 1 wherein:

said stem device includes a plurality of removable spacer elements to be selectively removed to accommodate different horizontal dimensions of said compartment.

11. The beverage container holder set forth in claim 1 for receipt in a door pocket having a planar exterior wall and wherein:

said body and stem cooperate to form a planar sidewall for complementally contacting said door wall.

12. A beverage container holder as set forth in claim 1 adapted for mounting in a compartment having a rectangular cross-section with opposed parallel walls spaced a predetermined distance apart and wherein:

said stem is constructed of compressible material and is configured in its uncompressed state with said stem walls spaced apart a distance greater than said predetermined distance but compressible to said predetermined distance.

13. A beverage container holder adapted for mounting in a door pocket on an interior wall of a door of an automobile and having a pocket wall cooperating with such interior wall to form a rectangular in horizontal cross section interior compartment of a predetermined width, such holder comprising:

a vertical stem having a rectangular horizontal cross section and a width of at least 6 cm adapted to be friction fit in said compartment;

a body formed integrally on top of said stem and projecting laterally inwardly away from said interior wall over said pocket wall and configured with an upwardly opening beverage holder-receiving cavity.

14. A beverage container holder adapted to be mounted in a polygonal in cross-section upwardly open compartment in the interior of an automobile the type having opposite planar compartment walls spaced apart a predetermined distance and comprising:

a vertical stem having a rectangular vertical cross-section configured to be received in close fit relationship in said compartment;

a body formed integrally on top of said stem and configured with an upwardly opening cavity for receipt of a beverage container; and a stabilizer for stabilizing said stem against forward and rearward tilting.

15. A beverage container holder adapted for mounting in an upwardly opening automotive storage compartment having a width of at least 8 cm and comprising:

a vertically elongated holder body symmetrical about a vertical axis and including an upwardly opening beverage holder receiving cavity;

a compressible downwardly projecting stem having a horizontal cross section positioned unsymmetrical with the longitudinal extension of said axis and formed with an uncompressed width greater than 8 cm to be compressed to frictionally fit in said compartment.

16. A beverage container holder adapted to mount in a polygonal in horizontal cross section, upwardly opening door storage compartment in an automobile interior of an automobile, such compartment having a planar door wall and an opposite planar compartment wall spaced apart a predetermined distance from the door used and comprising:

a body for disposition over such compartment and formed with an upwardly opening cavity configured to receive a beverage container;

a downwardly projecting polygonal in horizontal cross section stem device integral with said body and having at least one planar stem side spaced from an opposite stem side, said stem sides being spaced apart a distance and adapted to be received complementally in friction fit relationship in said compartment to be held therein;

said body and stem cooperating to form a planar sidewall for complementally contrary said door wall.

17. A beverage container holder adapted to mount in a horizontal cross section, upwardly opening storage compartment in an automobile interior of an automobile, such compartment having opposite planar compartment walls spaced apart a predetermined distance and comprising:

a body for disposition over such compartment and formed with an upwardly opening cavity configured to receive a beverage container;

a downwardly projecting polygonal in horizontal cross section stem device constructed of compressible foam, integral with said body and having oppositely, facing planar walls spaced apart to contact said compartment walls and adapted to be received complementally in friction fit relationship in said compartment to be held therein to hold a beverage container received in said cavity.

18. A beverage container holder adapted to mount in a horizontal cross section, upwardly opening storage compartment in an automobile interior of an automobile, such compartment having opposite planar compartment walls spaced apart a predetermined distance and comprising:

a body for disposition over such compartment and formed with one side, with a flat wall for abutting one wall of said compartment and, with an upwardly opening cavity configured to receive a beverage container;

a downwardly projecting polygonal in horizontal cross section stem device integral with said body and having oppositely facing planar walls spaced apart to contact said compartment walls and adapted to be received complementally in friction fit relationship in said compartment to be held therein to hold a beverage container received in said cavity.

19. A beverage container holder adapted to mount in a polygonal in horizontal cross section, upwardly opening storage compartment in an automobile interior, such compartment having opposite planar compartment walls spaced apart a predetermined distance and comprising:

a thermoplastic foam body for disposition over such compartment and formed with an upwardly opening cavity configured to receive a beverage container;

a downwardly projecting polygonal in horizontal cross section thermoplastic foam stem device integral with said body and having at least one planar stem side spaced from an opposite stem side, said stem sides being spaced apart a distance and adapted to be received complementally in friction fit relationship in said compartment to be held therein to hold a beverage container received in said cavity.

20. A beverage container holder adapted to mount in a polygonal in horizontal cross section, upwardly opening door pocket having planar door and interior walls spaced apart a predetermined distance and comprising:

a body for disposition over such compartment and formed with an upwardly opening cavity configured to receive a beverage container;

a downwardly projecting polygonal in horizontal cross section stem device integral with said body and having at least one planar stem side spaced from an opposite stem side, said stem sides being spaced apart a distance and adapted to be received complementally in friction fit relationship in said compartment between said planar walls to be held therein to hold a beverage container received in said cavity; and said body and stem cooperating to form a planar side wall for complementally contacting said door wall.

21. A beverage container holder adapted to mount in a polygonal in horizontal cross section, upwardly opening storage compartment in an automobile interior, such compartment having opposite planar compartment walls spaced apart a predetermined distance and comprising:

a body for disposition over such compartment and formed with an upwardly opening cavity configured to receive a beverage container;

a downwardly projecting polygonal in horizontal cross section stem device integral with said body and having at least one planar stem side spaced at least 6.5 cm from an opposite stem side, said stem sides being spaced apart a distance and adapted to be received complementally in friction fit relationship in said compartment to be held therein to hold a beverage container received in said cavity.

* * * * *